(12) United States Patent
Anderson (10) Patent No.: US 7,346,669 B2
(45) Date of Patent: Mar. 18, 2008

(54) METHOD, APPARATUS AND SYSTEM FOR PROCESSING MESSAGE BUNDLES ON A NETWORK

(75) Inventor: Todd A. Anderson, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 364 days.

(21) Appl. No.: 10/326,395

(22) Filed: Dec. 19, 2002

(65) Prior Publication Data

US 2004/0122902 A1 Jun. 24, 2004

(51) Int. Cl.
G06F 15/16 (2006.01)
(52) U.S. Cl. ...................... 709/219; 709/233
(58) Field of Classification Search ............... 709/219, 709/223, 310, 208; 370/394, 395; 715/536, 715/712
See application file for complete search history.

(56) References Cited

U.S. PATENT DOCUMENTS

| | | | | |
|---|---|---|---|---|
| 5,539,740 A * | 7/1996 | Bruckner | .................... | 370/394 |
| 6,075,994 A * | 6/2000 | Bhat | .................... | 455/458 |
| 6,389,126 B1 * | 5/2002 | Bjornberg et al. | ..... | 379/201.03 |
| 6,539,017 B1 * | 3/2003 | Davison | ................ | 370/395.21 |
| 6,597,684 B1 * | 7/2003 | Gulati et al. | ................ | 370/351 |
| 6,775,707 B1 * | 8/2004 | Bennett et al. | ............. | 709/233 |
| 6,801,936 B1 * | 10/2004 | Diwan | ....................... | 709/219 |
| 6,965,854 B2 * | 11/2005 | Cutlip | .......................... | 703/21 |
| 7,069,509 B2 * | 6/2006 | Griffin | ......................... | 715/712 |
| 7,085,814 B1 * | 8/2006 | Gandhi et al. | .............. | 709/208 |
| 2003/0131320 A1 * | 7/2003 | Kumhyr et al. | ............. | 715/536 |
| 2003/0167223 A1 * | 9/2003 | Pledereder et al. | ........... | 705/37 |
| 2003/0188035 A1 * | 10/2003 | Lubbers et al. | ............. | 709/310 |

OTHER PUBLICATIONS

An integrated solution for secure group communication in wide-area networks Agarwal, D.A.; Chevassut, O.; Thompson, M.R.; Tsudik, G.; Computers and Communications, 2001. Proceedings. Sixth IEEE Symposium on Jul. 3-5, 2001 pp. 22-28.*
Principle and technique for encapsulation of user control and data information in seperate frames Chooi-Tian Lee; Harris, J.W.; Local Computer Networks, 1996., Proceedings 21st IEEE Conference on Oct. 13-16, 1996 pp. 384-393.*
Reducing variations in parallel efficiency for unstructured grid computations Womer, B.; Geuder, U.; Hardtner, M.; Zink, R.; High Performance Distributed Computing, 1994., Proceedings of the Third IEEE International Symposium on Aug. 2-5, 1994 pp. 287-294.*

* cited by examiner

*Primary Examiner*—Thong Vu
(74) *Attorney, Agent, or Firm*—Michael R. Barre (57) ABSTRACT

Network bundles may be processed in a distributed network having a decentralized serving structure. The message bundles may be modified to include a client address. Additionally, each message bundle comprises a plurality of sub-messages, and each sub-message may contain either a link to the output of another sub-message, or a network address. A network device may be implemented to gather responses to the sub-messages from various servers and to organize the responses into a final response to send to the client.

8 Claims, 4 Drawing Sheets

METHOD, APPARATUS AND SYSTEM FOR PROCESSING MESSAGE BUNDLES ON A NETWORK

FIELD OF THE INVENTION

The present invention relates to the field of networking, and, more particularly to a method for processing messages by a distributed and decentralized service infrastructure and constituent network.

BACKGROUND

A distributed file system enables a client to access and process data stored on a remote server as if it were on the client machine. In a distributed file system running on a high latency network (e.g., a wide area network), client machines may experience significant delay when attempting to retrieve data from a remote server especially when retrieving that data may require multiple network round trips (as described in further detail below). Distributed file systems may be centralized or decentralized. In a centralized serving environment, all data (e.g., directories and files) typically resides on the same machine as the metadata (e.g., data pertaining to the location of the files or directories and other such related information). A client may therefore access metadata and data from a single centralized server by navigating the server's file system. File systems are well known to those of ordinary skill in the art and further description thereof is omitted herein.

In a decentralized serving environment, on the other hand, the data and metadata may reside on different servers (e.g., the data, comprising the contents of files and directories, on data server(s) and metadata on metadata server(s)). In order for a client to retrieve data on a network comprising such a decentralized file system, the client first obtains metadata from a metadata server and uses this information to determine the location of the data. The client may then access the data from the appropriate data server location by navigating the data server's file system.

When a client retrieves a file (e.g., document File A) from a server, the client first sends a message to a metadata server, asking for information (metadata) pertaining to File A. The client then parses the metadata and retrieves the file from the appropriate data server. Thus, for example, if File A resides within Subdirectory Z, which resides within Subdirectory Y, which in turn resides within Directory X, the complete path for File A may look as follows: X/Y/Z/A.doc. A client attempting to retrieve File A therefore may first locate Directory X, then Subdirectory Y and Subdirectory Z, and finally retrieve File A. Although transparent to the user, file system navigation may differ, depending on whether the file system is centralized or distributed.

Figure 1:
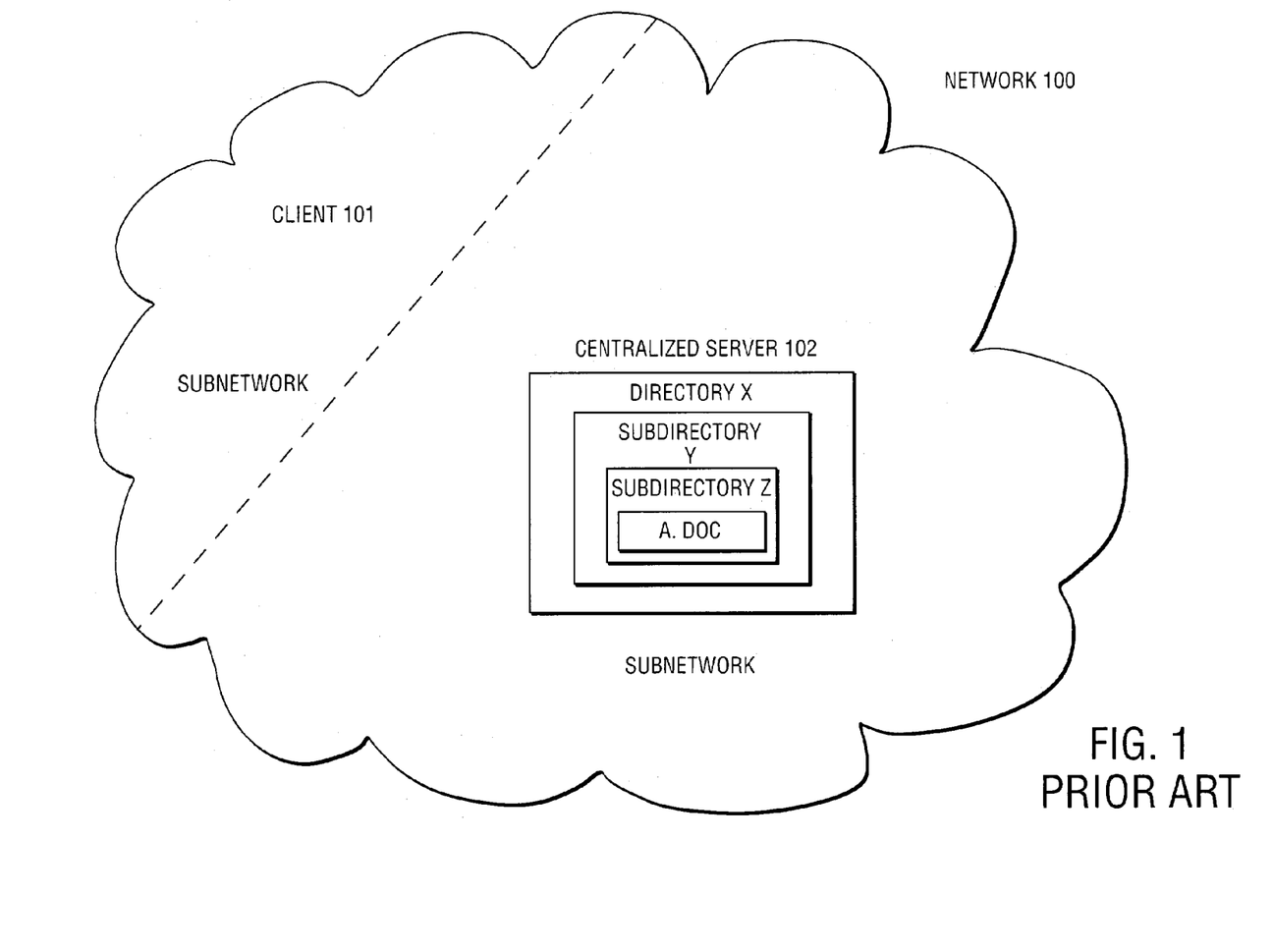
FIG. 1 illustrates a known method of retrieving data ("File A") on a distributed network including a centralized file server.

FIG. 1 illustrates a known method of retrieving data ("File A") on a distributed network including a centralized file server. As illustrated, Network 100 comprises multiple sub-networks and includes Client 101 and Centralized Server 102. Centralized Server 102 includes Directory X, Subdirectory Y and Subdirectory Z, and Subdirectory Z includes File A.doc. Centralized Server 102 also includes all metadata corresponding to File A.doc (e.g., the locations of Directory X, Subdirectory Y, Subdirectory Z and File A.doc on Centralized Server 102). When Client 101 desires to access X/Y/Z/A.doc, Client 101 first obtains the metadata for Directory X, Subdirectory Y, Subdirectory Z, and File A.doc, and then uses all the retrieved metadata to access the contents of that file. An example of a distributed file system with a centralized server is UNIX-based Network File Server (Version 4, Internet Engineering Task Force, RFC 3010, hereafter "NFS V4").

Figure 2:
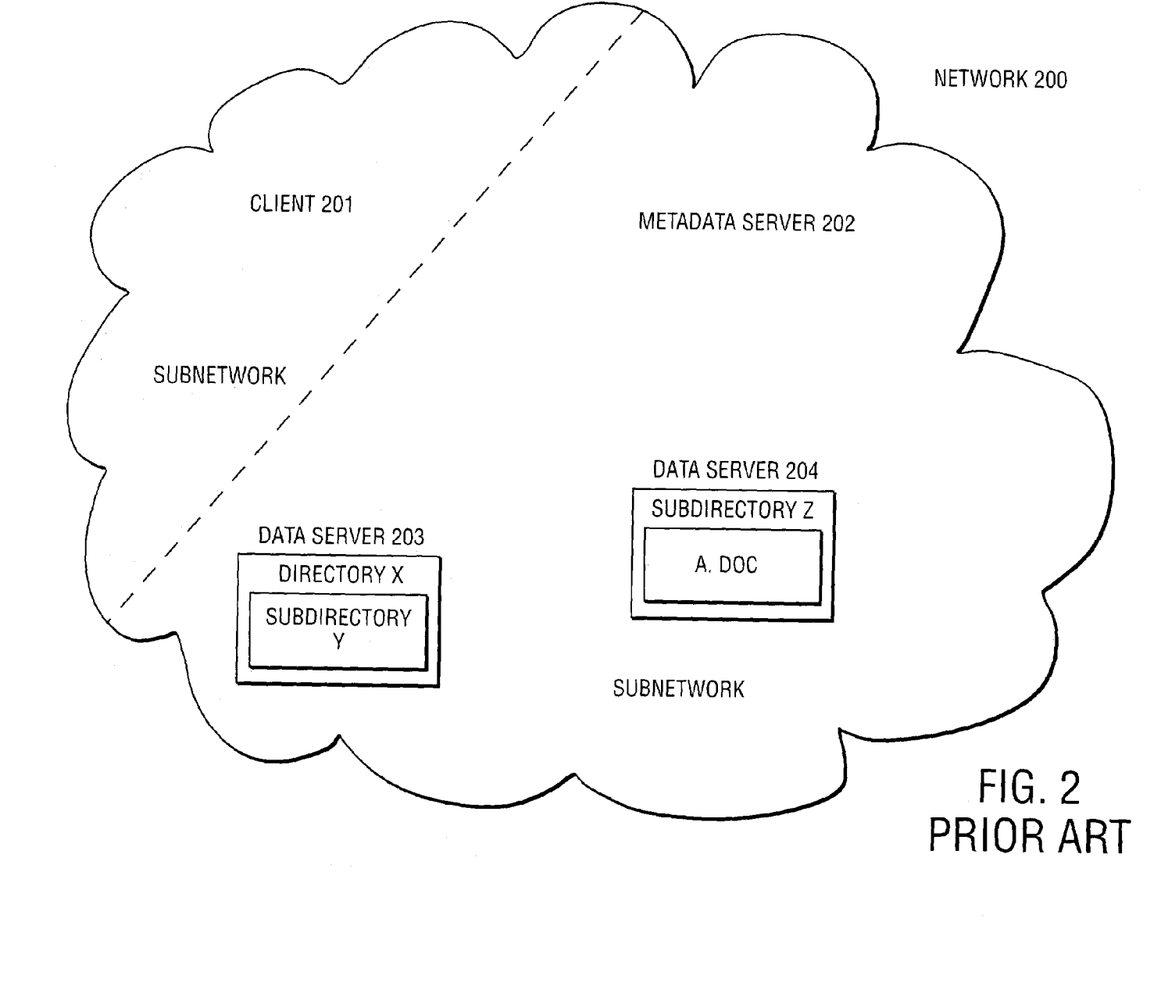
FIG. 2 illustrates a known method of retrieving File A on a distributed network having a decentralized file system.

FIG. 2 illustrates a known method of retrieving File A.doc on a distributed, decentralized file system. As illustrated, Network 200 comprises multiple sub-networks and includes Client 201, Metadata Server 202 and Data Servers 203 and 204. Data Server 203 includes Directory X. The contents of all directories on Data Server 203, including Directory X, may be presented as a list of names and unique identifiers for all included subdirectories, and the metadata server on which the metadata for each of the included subdirectories can be found. In the illustrated example, Directory X may contain a single entry that indicates that Subdirectory Y's metadata is on Metadata Server 202. In turn, Subdirectory Y may contain only Subdirectory Z. Given the decentralized nature of the file system depicted in Network 200, however, Subdirectory Y may physically reside on Data Server 203 while Subdirectory Z may physically reside on Data Server 204.

When Client 201 desires to access X/Y/Z/A.doc, Client 201 may have to perform the following. First, Client 201 may obtain the metadata for Directory X from Metadata Server 202. Client 201 may then use this metadata to determine that the contents of Directory X are stored on Data Server 203. Client 201 may then retrieve the contents of Directory X and determine that Subdirectory Y exists and that Subdirectory Y's metadata is also stored on Metadata Server 202. Client 201 may again contact Metadata Server 202 to identify the location of the contents of Subdirectory Y. Once again, Client 201 may determine that Subdirectory Y's data is on Data Server 203. Client 201 may then contact Data Server 203 yet again to identify the contents of Subdirectory Y. Client 201 may determine that Subdirectory Z exists in Subdirectory Y and that the metadata for Subdirectory Z can be found on Metadata Server 202. Thereafter, Client 201 may contact Metadata Server 202 to identify where the contents of Subdirectory Z are stored. Upon determining that the contents of Subdirectory Z reside on Data Server 204, Client 201 may then contact Data Server 204 to get the contents of Subdirectory Z. Client 201 may then determine that File A.doc exists and that the file's metadata may be located on Metadata Server 202. Client 201 may then contact Metadata Server 202 to find the location of the contents of File A.doc and again determine that the contents of file A.doc are on Data Server 204. Finally, Client 201 may contact Data Server 204 to retrieve the contents of File A.doc.

As illustrated by the above figures, in either centralized or decentralized file systems, the client (Client 101 or Client 201) may need to send a set of several related messages (e.g., commands, queries, instructions, method invocations, etc.) in succession to a server to retrieve data. For example, when attempting to access File A in either scenario, the client may send a series of messages to the serving infrastructure to parse the directory structure and then to locate and access File A.

As illustrated in the above example, retrieval of File A from a data server on a distributed network may thus involve numerous messages over the network. In many distributed file systems, these messages must be sent one at a time because the output of one message may be the input to the next message. Thus, each message and/or query often requires a network roundtrip, from the client to the server and back. The network roundtrips are likely to be on a Wide Area Network ("WAN"), i.e., across networks with a high round-trip latency. These roundtrips are therefore likely to have a significant negative impact on performance.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Embodiments of the present invention provide a method, apparatus and system for processing network message bundles in decentralized distributed systems. Reference in the specification to "one embodiment" or "an embodiment" of the present invention means that a particular feature, structure or characteristic described in connection with the embodiment is included in at least one embodiment of the present invention. Thus, the appearances of the phrases "in one embodiment," "according to one embodiment" or the like appearing in various places throughout the specification are not necessarily all referring to the same embodiment.

In order to address the problem of multiple roundtrip messages on high latency networks such as WANs, some distributed file systems have implemented "message bundling." Message bundling enables a client to group together commands ("messages") that relate to one another into a "bundle," and send the message bundle to the server in a single transmission. The server may process the various messages in the message bundle ("sub-messages") prior to sending the appropriate data back to the client. This batch processing of messages results in elimination of multiple WAN roundtrips. As used herein, WANs shall include any high latency network environment.

Distributed networks that employ centralized serving, such as NFS V4, may currently implement this message bundling methodology. With message bundling, Client 101 in FIG. 1 above may send a single message bundle to Centralized Server 102 in order to retrieve File A.doc. Centralized Server 102 may execute all the sub-messages within the message bundle consecutively, potentially use the output of each sub-message as the input for the next sub-message, and retrieve the result (e.g., File A.doc) to transmit to Client 101. If, as illustrated, Centralized Server 102 is on a separate sub-network from Client 101, i.e., each roundtrip may be across a WAN, the elimination of multiple roundtrips contributes to a significant increase in performance on a high latency network.

The current message bundling methodology does not, however, work within a decentralized serving environment. In a decentralized serving environment, the functions originally performed by a single server (e.g., Centralized Server 102 in FIG. 1) are instead spread out amongst two or more servers (e.g., Metadata Server 202, Data Server 203 and Data Server 204 in FIG. 2) with the goal of allowing those servers to specialize in different functionality and to distribute the load for more scalability. In such a decentralized serving environment, there is no single node available to receive a message bundle, determine where each sub-message in the bundle should be sent, collect the various returned results and respond to the client.

Embodiments of the present invention enable message bundles to be processed in a decentralized serving environment. More specifically, various aspects of the traditional message bundling methodology may be modified to enable the bundles to be processed in the decentralized serving environment. According to one embodiment of the present invention, the message bundling structure itself may be modified. In an embodiment, the methodology used by the servers on the network to process the message bundles may also be modified. Embodiments of the present invention may also modify the manner in which the data is returned from the server(s) to the client. The following paragraphs address each of these areas in turn.

According to one embodiment, a message bundling structure in a decentralized serving environment may be implemented as follows. The network address of the client originating the message bundle may be added to the bundle to ensure that any machine on the network that receives the message bundle knows the source of the bundle, i.e., the address to which any responses may be returned. Additionally, according to embodiments of the present invention, the sub-messages in the message bundle may include information necessary to properly process the sub-messages. Specifically, the first sub-message in each message bundle may contain a network address of a server, and each subsequent sub-message in the message bundle may contain either a network address for a server and/or a "link" to an output from a previous command.

Thus, for example, if a client generates a message bundle comprising two sub-messages, according to embodiments of the present invention, the message bundle may include the following. In one embodiment, if the client is aware that these sub-messages need to be executed on different servers, and the client knows the network address of each of those servers, the client may specify those known network addresses in the first and second sub-messages of the message bundle respectively.

In an alternate embodiment, the client may only be aware of the network address of the server that is responsible for executing the first sub-message. The output of the first sub-message may then provide the client with the network address of the server responsible for executing the second sub-command. In this embodiment, the client may specify the first server's network address in the first sub-message in the bundle and a "link" in the second sub-message in the bundle pointing to network address output parameter of the first sub-message. The output of the first sub-message may thus be used as an input to the second sub-message. Although the foregoing example assumes that the input of the second sub-message is the output of the sub-message immediately preceding the second sub-message, in embodiments of the present invention, for larger message bundles containing more than two sub-messages, a link may not necessarily specify as input the output of the immediately preceding sub-message. Instead, the link may refer to any output parameter of any of the preceding sub-messages in the message bundle.

Once a message bundle has been constructed (with network addresses and/or links), the client may transmit the bundle to the first server, and wait for a response. According to one embodiment, the first server processes the first sub-message in the bundle, and then examines the remaining sub-messages in the bundle. The first server then replaces any links that refer to the output of the first sub-message with a corresponding network address, i.e. the output resulting from processing the first sub-message. The server may also examine the second sub-message in the bundle. In one embodiment, the network address specified in the second sub-message may be the same as the current server's address. In this instance, the server may repeat the process described above, i.e. the server may process the second sub-message in the bundle and replace any links that refer to the output of the second sub-message. The server may repeat this process as many times as necessary so long as the network address in the next sub-message to be processed is its own. In one embodiment, the server may then send its responses to the client (i.e., the server may gather together the responses to all sub-messages that it processed and send those responses to the client in one transmission). In an alternate embodiment, the server may send out a response to each sub-message as it processes the sub-message.

In an embodiment of the present invention, when the server examines a subsequent sub-message in the bundle, it may encounter a network address other than its own. In this instance, the server may modify the message bundle by deleting the sub-messages that it processed. The server may then forward the modified message bundle to the network address of the second server specified in the first sub-message not processed by the first server. The second server may then process the first sub-message in the modified bundle and repeat the process, potentially sending yet another modified bundle to another server.

Once the sub-messages have been processed, the responses are transmitted back to the client. In one embodiment of the present invention, once a client dispatches a message bundle to a server, it expects to receive responses from that server, in the order corresponding to the order of the requests in the original message bundle. Thus, for example, if Client 201 in FIG. 2 above dispatches a message bundle containing sub-messages 1, 2 and 3 to Metadata Server 202, Client 201 may expect responses from Metadata Server 202, and it may expect to receive a response to sub-message 1 before the responses to sub-messages 2 and 3. In a centralized serving environment, this order may be maintained naturally because a centralized server (e.g. Centralized Server 102 in FIG. 1 above) may process the sub-messages in the message bundle consecutively and return the results in order. In a distributed serving environment, however, this order is not guaranteed because there is no centralized server. As a result, each sub-message in the message bundle may be processed by a different server (e.g., Metadata Server 202, Data Server 203 and/or Data Server 204 in FIG. 2 above) and the output from each sub-message may be returned to the client without regard for the other sub-messages.

Figure 3:
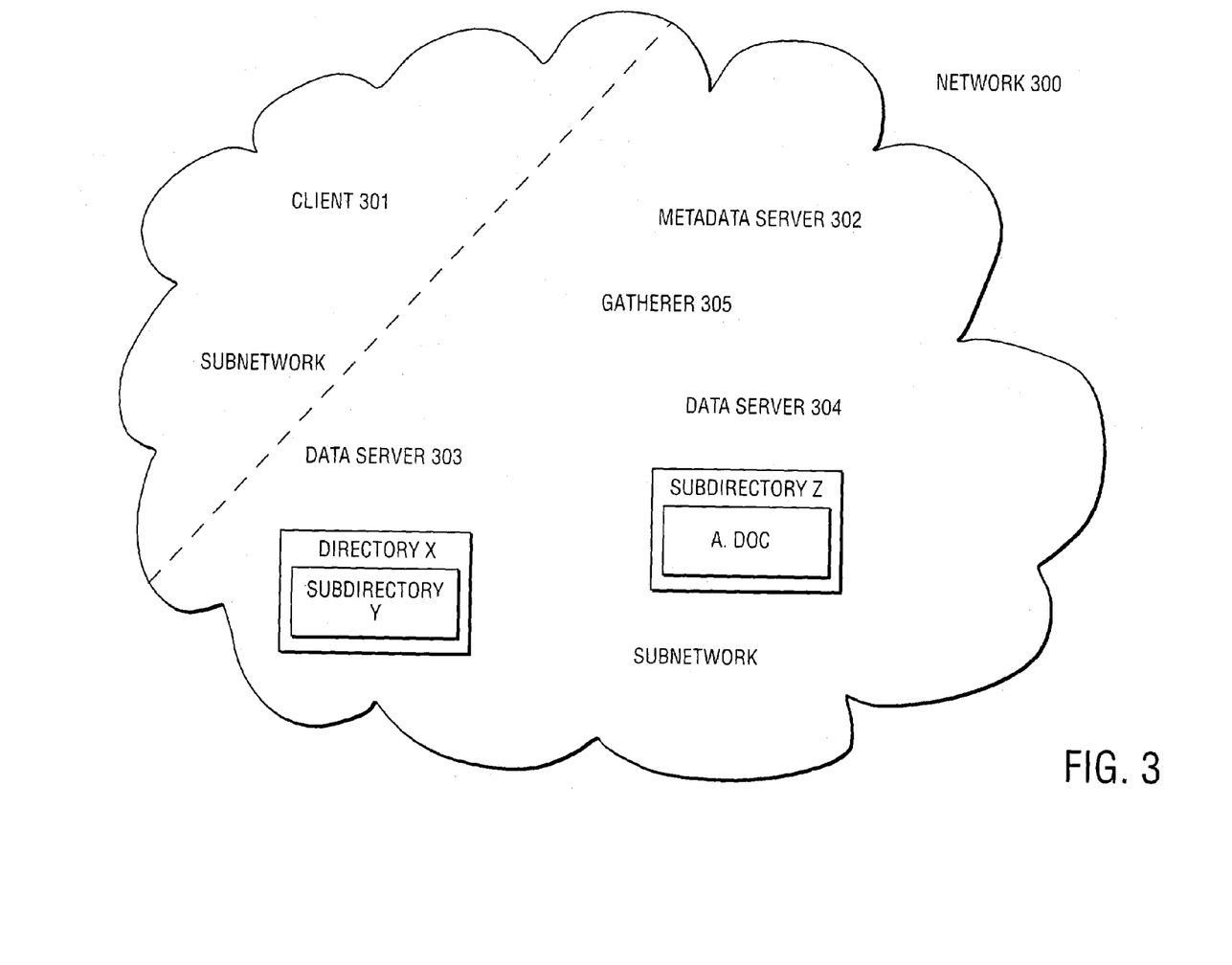
FIG. 3 illustrates a system according to one embodiment of the present invention.

According to one embodiment of the present invention, a network device (hereafter referred to as a "gatherer") may be utilized to gather the responses from various servers prior to returning the output of the various servers to the client. FIG. 3 illustrates a system according to one embodiment of the present invention. As illustrated, Network 300 comprises multiple sub-networks and includes Client 301, Metadata Server 302 and Data Servers 303 and 304. Network 300 additionally includes Gatherer 305. As illustrated, Metadata Server 302, Data Servers 303 and 304, and Gatherer 305 are on the same sub-network. In other words, network traffic amongst these nodes travels within a local area network ("LAN"), which tends to experience low network latencies, instead of a WAN, which tends to experience high network latencies. Client 301, on the other hand, may reside on a separate sub-network from the servers and Gatherer 305.

In one embodiment, Gatherer 305 may be a router along the common path from Client 301 to the servers (Metadata Server 302 and Data Servers 303 and 304). It will be readily apparent to those of ordinary skill in the art that Gatherer 305 may be selected by plotting the paths between Client 301 to each of the servers, and identifying a network device on the route through which all traffic between Client 301 and the servers must travel. According to one embodiment, Gatherer 305 may be identified dynamically with the participation of the servers. In an alternate embodiment, Gatherer 305 may be statically assigned by a network administrator or other such network management entity who engineers the network in such a way that all the traffic from the servers will pass through one and only one gatherer.

To enable Gatherer 305 to properly collect all responses to a message bundle, according to one embodiment of the present invention, each server (e.g., Metadata Server 302 and Data Servers 303 and 304) that responds to a sub-message in a message bundle may add a header to their output. The header may include a unique message bundle ID (i.e., an ID that uniquely identifies a particular message bundle), the network address of the client, the last sub-message number (i.e., the total number of sub-messages in the original message bundle) and a current sub-message number.

In order to ensure that the message bundle ID generated for a message bundle is unique, in one embodiment, the servers may utilize their network interface card addresses as a prefix to the message bundle ID. Network interface cards typically adhere to existing network standards to ensure that the card addresses (e.g., 48 bit 802.3 MAC addresses) are unique. In one embodiment, each server may use the 48-bit unique address and append a number or character to the address (up to 16 bits) to serve as a unique message ID. It will be readily apparent to those of ordinary skill in the art that various other methods may be employed to ensure that the message bundle ID is unique for each message bundle.

It will additionally be readily apparent to one of ordinary skill in the art that for a given message bundle ID, each server must report the same value for the "last sub-message number" (the total number of sub-messages in the original message bundle). The first server to receive the message bundle (e.g., Metadata Server 302) may assign the message bundle ID and append it to the message bundle data structure. Subsequent servers (e.g., Data Servers 303 and 304) may user this unique ID in their responses to Client 301. For the purposes of illustration, the following description assumes that Metadata Server 302 is the first server that Client 301 sends its message bundle to, and that Data Servers 303 and 304 are the subsequent servers that process other sub-messages in the message bundle. It will be readily apparent to those of ordinary skill in the art, however, that this designation is for descriptive purposes only and the order is not necessary to implement embodiments of the present invention.

In one embodiment, Gatherer 305 examines all network traffic that passes through it for headers that the various servers may have added to the output of a sub-message in a message bundle. Based on these headers, Gatherer 305 may continue to gather the output from various servers until it has received all of the responses for each of the sub-messages. In one embodiment, Gatherer 305 may use the "last sub-message number" in the headers to determine whether it has received all the responses to a particular message bundle, identified by its unique message ID. Upon receipt of all the responses for a message bundle, Gatherer 305 may then generate a single response consisting of each of the sub-message responses (hereafter "the Response"). When generating the Response, according to one embodiment of the present invention, Gatherer 305 may organize the sub-message responses in the appropriate order (e.g., using the "current sub-message number" and "last sub-message number to order the various responses). Gatherer 305 may then send the Response to Client 301.

In one embodiment, the Response from Gatherer 305 to Client 301 may be addressed from Metadata Server 302 to maintain the illusion that the first server is responding to the entire message bundle. Thus, for example, when Client 301 receives the Response, the Response appears to originate in its entirety from Metadata Server 302, i.e., the first server that received Client 301's message bundle. In other words, it may be transparent to Client 301 that the sub-messages in the bundle were processed by multiple servers. This illusion may be accomplished in a number of ways.

In one embodiment, the system in FIG. 3 may be implemented using a connectionless protocol such as the User Datagram Protocol ("UDP"). As is well known to those of ordinary skill in the art, UDP is an inherently unreliable protocol, i.e., there is no assurance that a message sent using the UDP protocol will be delivered. This characteristic of UDP may not, however, be problematic for a certain class of network applications. If a system according to one embodiment of the present invention is implemented using UDP, when Gatherer 305 collects the responses from various servers and generates the Response, Gatherer 305 may send the Response to Client 301 using Metadata Server 302's address as the originating address for the Response. This process is facilitated by the fact that UDP connections are stateless, i.e., no connections are established between Client 301 and any of the servers or Gatherer 305. It will be readily apparent to those of ordinary skill in the art that manipulating a UDP header (i.e., IP source/destination address, source/destination port number, and checksum) to make it appear as if the Response was sent from the first server may be accomplished by creating a packet with the original server's IP address and port number.

Connection-oriented transport protocols are currently more widely used than connectionless protocols. In order to accomplish a similar result as the above in a system using a connection-oriented network transport protocol, such as Transport Control Protocol ("TCP"), the Gatherer 305 may have to perform additional steps to ensure that responses from the servers to Client 301 are handled properly. Although the following description assumes the use of TCP, it will be readily apparent to those of ordinary skill in the art that other connection-oriented protocols may also be used without departing from the spirit of the present invention.

According to one embodiment, Client 301 may establish a TCP session with Metadata Server 302 when it initially sends out its message bundle. To enable Gatherer 305 to route a final response to Client 301, Gatherer 305 may ensure that the TCP connection between Client 301 and Metadata Server 302 is not terminated while Gatherer 305 collects responses to Client 301's message bundle. Additionally, according to an alternate embodiment, Gatherer 305 "masquerades" as Client 301 to Data Servers 303 and 304 to enable the servers to respond to the sub-messages in the message bundle. Details of each embodiment are described in further detail below.

According to one embodiment, Gatherer 305 ensures that the TCP connection between Client 301 and Metadata Server 302 is not terminated while Gatherer 305 collects responses to Client 301's message bundle. Specifically, Client 301 may establish a TCP session with Metadata Server 302 by sending a TCP message (i.e., TCP SYN) to Metadata Server 302. Once the TCP session is established, Client 301 may send a message bundle to Metadata Server 302. According to one embodiment, Metadata Server 302 may process the first sub-message in the bundle, send a response to Client 301 for the first sub-message in the bundle, delete the first sub-message and send the modified message bundle to the next server (Data Server 303, in this example). Metadata Server 302 may then send a TCP shutdown message (i.e., TCP FIN) to Client 301 to terminate the TCP session with Client 301. Establishing and terminating TCP sessions is well known to those of ordinary skill in the art and further description thereof is omitted herein in order not to unnecessarily obscure the present invention.

According to one embodiment of the present invention, Gatherer 305 may intercept the response from Metadata Server 302 to Client 301. Gatherer 305 may also intercept the TCP FIN message from Metadata Server 302 to Client 301. In other words, Gatherer 305 may send the appropriate responses to Metadata Server 302, allowing Metadata Server 302 to believe that the TCP session with Client 301 has been terminated. Upon receiving responses to other sub-messages in the message bundle from other servers (Data Servers 303 and 304 in this example), Gatherer 305 may organize the responses, generate a Response to the message bundle, and send the Response to Client 301, purportedly "from" Metadata Server 302. Gatherer 305 may then send a TCP FIN message to Client 301 to terminate the TCP session. According to one embodiment of the present invention, Gatherer 305 acts transparently, i.e., neither the servers nor Client 301 may be aware that Gatherer 305 may be intercepting and handling their messages in the above described manner.

As described above, upon processing the first sub-message in the message bundle, Metadata Server 302 may delete the first sub-message and forward the modified message bundle to another server (Data Server 303 in this example) for processing. Data Server 303 may repeat this process and send a modified message bundle to Data Server 304. Upon processing the sub-messages, Data Servers 303 and 304 may each attempt to respond to Client 301 (based on Client 301's address in the message bundle). More specifically, each server may send a TCP message (i.e., TCP SYN) to Client 301 to establish a TCP session with Client 301.

According to one embodiment, Gatherer 305 may intercept the TCP SYN messages from the servers. In other words, Gatherer 305 may "masquerade" as Client 301 to Data Servers 303 and 304. Each server may therefore establish a TCP session with Gatherer 305, send out its response and then terminate the session. Gatherer 305 may collect all the responses, organize the responses and send the combined Response to the actual client, Client 301.

According to an alternate embodiment of the present invention, Client 301 may be configured to accept responses from various servers. In this embodiment, the functionality of Gatherer 305 above may logically be incorporated into Client 301. If so, Client 301 may send out a message bundle to Metadata Server 302, which may process the first sub-message, send a response to Client 301, examine the remaining sub-messages, replace any links as appropriate with its output, delete the first sub-message and forward the modified message bundle to the next server. The next server may repeat the process and forward yet another modified message bundle to a third server. According to this embodiment, however, instead of Gatherer 605 intercepting communications between the servers and Client 301, Client 301 may establish TCP sessions with various servers, receive the responses to the sub-messages in the order in which they come in, and then organize the responses into a final response to the original message bundle.

As will be readily apparent to those of ordinary skill in the art, in the event one of the servers fails to process a sub-message, Gatherer 305 may receive no responses for a sub-message in a message bundle. If, for example, Metadata Server 302 processes its sub-message and sends the response back to Client 301 (intercepted by Gatherer 305), but the subsequent server, Data Server 303, fails to process its sub-message, Data Server 303 may send an error message indicating its failure. According to one embodiment of the present invention, Data Server 303 may also send error messages (e.g., the "unprocess" message) for the sub-messages remaining in the message bundle. In one embodiment, Gatherer 305 may intercept all the error messages, and upon receiving either a response or an error for each of the sub-messages, Gatherer 305 may forward the response bundle to Client 301. In an embodiment, the response and/or error message from a server may fail to arrive at Gatherer 305 altogether. In this embodiment, Gatherer 305 may wait for responses for a predetermined amount of time until it times out. Client 301 may then have to resend its message bundle for processing. This technique (known as "soft state") is well known to those of ordinary skill in the art and further description thereof is omitted herein in order not to unnecessarily obscure the present invention.

Figure 4:
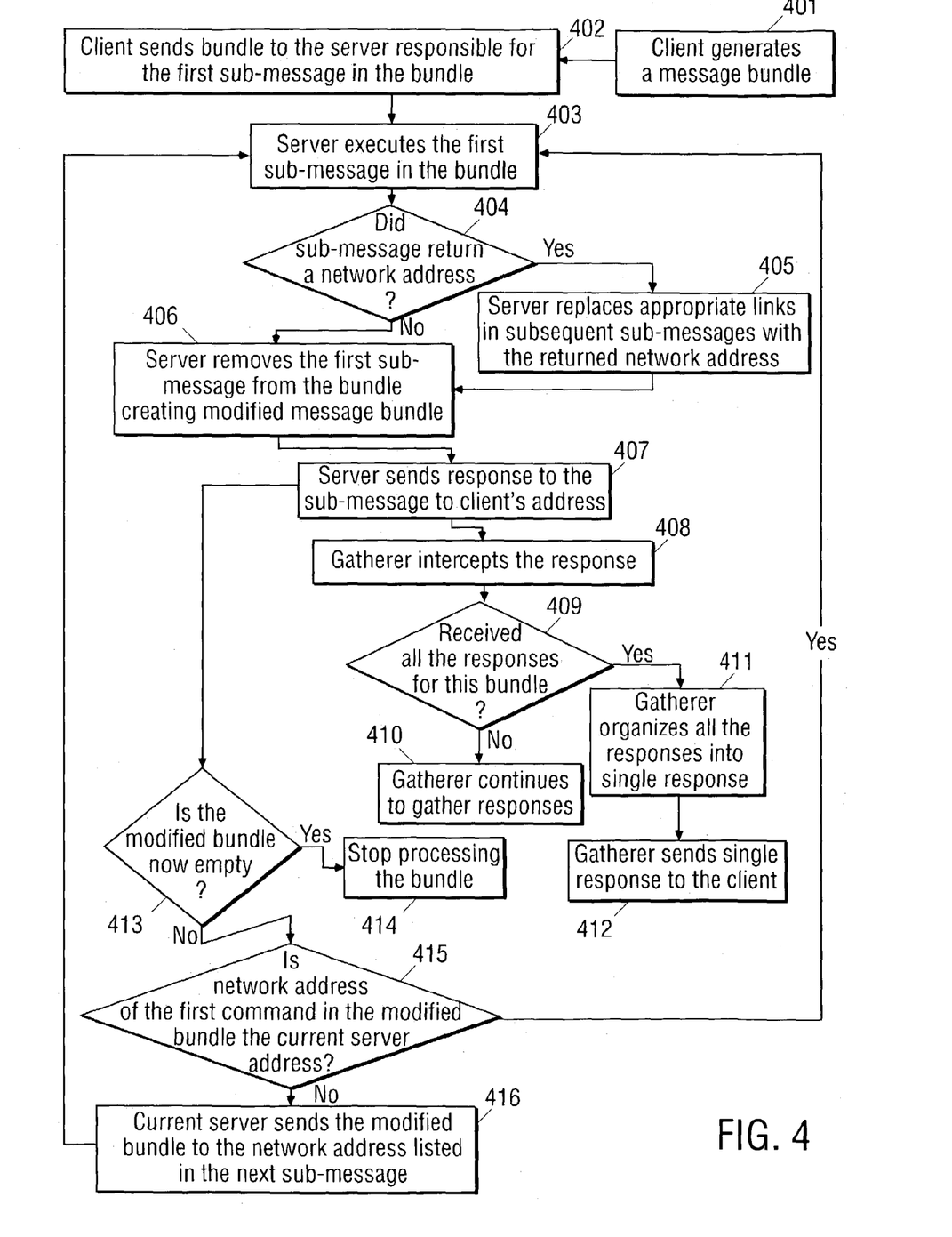
FIG. 4 is a flow chart illustrating an embodiment of the present invention.

FIG. 4 is a flow chart illustrating an embodiment of the present invention. As illustrated, in 401, a client generates a message bundle and sends the bundle to the server responsible for the first sub-message in the bundle in 402. The server executes the first sub-message in the bundle in 403. In 404, the response to the sub-message is examined to determine whether the sub-message returned a network address. If the sub-message returned a network address, in 405, the server may replace the appropriate links in subsequent sub-messages with the returned network address. The server may then remove the first sub-message from the message bundle. If the sub-message did not return a network address in 404, then the server skips 405 and simply removes the first sub-message from the bundle in 406. In 407, the server may then send the result of the sub-message to the client's address. The gatherer may intercept this response in 408, and continue to do so until it has received all the responses for a particular message bundle. In 409, if the gatherer determines that it has not received all the responses to the sub-messages in a particular message bundle, the gatherer may continue caching the responses it receives in 410. If, however, the gatherer determines that it has received all the responses to the sub-messages, it may organize all the responses into a single response in 411 and send the single response to the client in 412.

Upon sending the result of the sub-message to the client's address in 407, the server may determine whether the message bundle is empty in 413. If the message bundle is now empty, i.e., all the sub-messages have been processed, the server may stop processing the bundle in 414. If, however, the message bundle is not empty, the server may then determine in 415 whether the network address of the next sub-message in the bundle is itself. If the address is not its own address, then in 416, the server sends the modified message bundle to the server address listed. The next server may then go through the same process beginning at 403. If, however, the address is its own address, the server will repeat the process itself beginning at 403.

The client and servers according to embodiments of the present invention may be implemented on a variety of data processing devices. According to embodiment of the present invention, data processing devices are machines that may include various components capable of executing instructions to accomplish an embodiment of the present invention. For example, the data processing devices may include and/or be coupled to at least one machine-accessible medium. As used in this specification, a "machine" includes, but is not limited to, any data processing device with one or more processors. As used in this specification, a machine-accessible medium includes any mechanism that stores and/or transmits information in any form accessible by a data processing device, the machine-accessible medium including but not limited to, recordable/non-recordable media (such as read only memory (ROM), random access memory (RAM), magnetic disk storage media, optical storage media and flash memory devices), as well as electrical, optical, acoustical or other form of propagated signals (such as carrier waves, infrared signals and digital signals).

According to an embodiment, a data processing device may include various other well-known components such as one or more processors. The processor(s) and machine-accessible media may be communicatively coupled using a bridge/memory controller, and the processor may be capable of executing instructions stored in the machine-accessible media. The bridge/memory controller may be coupled to a graphics controller, and the graphics controller may control the output of display data on a display device. The bridge/memory controller may be coupled to one or more buses. A host bus host controller such as a Universal Serial Bus ("USB") host controller may be coupled to the bus(es) and a plurality of devices may be coupled to the USB. For example, user input devices such as a keyboard and mouse may be included in the data processing device for providing input data.

In the foregoing specification, the invention has been described with reference to specific exemplary embodiments thereof. It will, however, be appreciated that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method for processing message bundles, comprising: generating a message bundle comprising a plurality of sub-messages, each of the plurality of sub-messages including information to process the plurality of sub-messages;
    examining the information in a first of the plurality of sub-messages to determine where to transmit the message bundle;
    transmitting the message bundle to a first server responsible for processing the first of the plurality of sub-messages
    processing the first of the plurality of sub-messages;
    examining the information in the second of the plurality of sub-messages to determine whether the second of the plurality of sub-messages is to be processed by one of the first server and a second server;
    if the second of the plurality of sub-messages is to be processed by the first server, processing the second of the plurality of sub-messages;
    if the second of the plurality of sub-messages is to be processed by a second server, deleting the first of the plurality of sub-messages to generate a modified message bundle comprising at least the second of the plurality of sub-messages; and transmitting the modified message bundle to the second server responsible for processing the second of the plurality of sub-messages in the modified message bundle.

2. The method according to claim 1 wherein the message bundle includes a network address of a client.

3. The method according to claim 2 further comprising inserting a response from processing the first of the plurality of sub-messages into the link in a subsequent one of the plurality of sub-messages.

4. The method according to claim 1 wherein the first of the plurality of sub-messages includes a network address of the first server.

5. The method according to claim 1 wherein each of the plurality of sub-messages includes at least one of a network address and a link.

6. A system for processing message bundles, comprising:

a client capable of generating a message bundle comprising a plurality of sub-messages, each of the plurality of sub-messages including information to process the plurality of sub-messages, the client further capable of examining the information in a first of the plurality of sub-messages to determine where to transmit the message bundle;

a first server capable of processing the first of the plurality of sub-messages in the message bundle, the first server additionally capable of examining the information in the second of the plurality of sub-messages to determine whether the second of the plurality of sub-messages is to be processed by one of the first server and a second server, if the second of the plurality of sub-messages is to be processed by the first server, the first server additionally processing the second of the plurality of sub-messages, if the second of the plurality of sub-messages is not to be processed by the first server, the first server additionally capable of deleting the first of the plurality of sub-messages to generate a modified message bundle comprising at least the second of the plurality of sub-messages; and a second server capable of processing the second of the plurality of sub-messages in the modified message bundle.

7. The system according to claim 6 wherein the message bundle includes a network address of the client.

8. The system according to claim 6 wherein the first of the plurality of sub-messages includes a network address of the first server.

* * * * *